United States Patent Office 3,070,564
Patented Dec. 25, 1962

3,070,564
ORGANIC SOLVENT COATING SOLUTIONS CONTAINING A POLYEPOXIDE AND A BUTYL METHACRYLATE POLYMER
Gerald P. Roeser, Lahaska, Pa., assignor, by mesne assignments, to Martin-Marietta Corporation, Chicago, Ill., a corporation of Maryland
No Drawing. Filed July 28, 1958, Ser. No. 751,115
23 Claims. (Cl. 260—33.6)

The present invention relates to finishing varnishes for decoration and protection of metal surfaces. The invention is particularly directed to finishing varnishes intended for application over lithographic inks. It is also of value as surface coatings for reflectors in electrical lighting appliances where the coating must withstand prolonged exposure to conditions of elevated temperature and strong ultraviolet radiation.

The compositions of the present invention also possess excellent utility as topcoats over a base coat. Moreover, the finishing varnishes of the invention possess outstanding utility when coated upon surfaces which have been printed with lithographic inks to provide a clear overcoat without causing bleeding and ridging of the ink despite the fact that the ink may be wet at the time that the overcoat is applied. Further, the finishing varnishes of the invention are adapted to provide topcoats over thermally-resistant primer coatings with the topcoat being characterized by high resistance to heat and ultraviolet radiation. Still further, the finishing varnishes of the invention possess outstanding adhesion to vinyl lacquer undercoats as well as other conventional undercoats frequently employed in the protective coating of metal surfaces to provide topcoats which are further characterized by high gloss.

FIELD OF INVENTION

In the conventional production of clear overcoats upon surfaces decorated with lithographic ink, it has been necessary to first dry the ink, as for example by baking, before application of the finishing varnish to prevent the ink from ridging and bleeding when the finishing varnish was applied.

It has long been desired to eliminate the necessity of drying the lithographic ink prior to application of finishing varnish so that the single baking operation employed in connection with the overcoat might serve to simultaneously dry both the ink and the overcoat. Prior efforts in this regard involved flocculation of ink pigment using components added to the solvent medium in the finishing varnish and are illustrated in United States Patents No. 2,597,864 and No. 2,597,865. Although bleeding and ridging of the wet lithographic ink have been controlled to some extent by the prior art suggestions, the finishing varnishes of the art have been deficient in simultaneously providing a topcoat having satisfactory clarity and gloss and resistance to aging and discoloration upon subjection to elevated temperature and ultraviolet radiation.

Selection of a resin vehicle to provide a topcoat possessing clarity, gloss, chemical resistance (particularly to water in liquid or vapor form), and resistance to yellowing upon subjection to elevated temperature and ultraviolet radiation presents a serious commercial problem which has long confronted the art. The additional requirement of providing a resin vehicle as above described which could be applied to wet lithographic ink without bleeding or ridging of the ink has not heretofore been satisfied.

Such resins as the polyester polymers, i.e., alkyd resins, have been deficient with respect to resistance to soap or alkaline detergents, resistance to heat, and have yellowed with age. The ultraviolet light resistance of these materials is also poor.

Allyl thermoplastic resins as well as polyethers such as the epoxy resins possess poor gloss characteristics and have been found to be quite unstable with regard to aging, particularly in the presence of ultraviolet light.

Melamine-formaldehyde or urea-formaldehyde resins which are plasticized with chemical plasticizers or polymeric plasticizers have been found to be deficient because of inadequate flexibility.

The vinyl halide-vinyl ester copolymers as well as the vinylidene halide-vinyl halide copolymers have been found to be inadequate because of their tendency to break down at elevated temperatures unless stabilized. Even when stabilized, these materials do not have adequate ultraviolet light resistance.

Oleoresinous varnishes are unsatisfactory because they impart color to the coated object. These materials also have inadequate ultraviolet light resistance.

THE COMPOSITIONS OF THE INVENTION

In accordance with the present invention a finishing varnish is provided which comprises as the essential resinous film forming agent specific copolymers comprising from 3–15 mol percent of acid selected from the group consisting of acrylic acid, methacrylic acid and mixtures thereof, preferably from 4–10 mol percent of said acid, with the balance of the copolymer being largely butyl methacrylate, said copolymers being combined with a limited proportion of a polyepoxide component to supply at least 0.1 mol of oxirane group in the polyepoxide per each carboxyl to cross-link with the carboxylic acid group of the copolymer and provide a stable and chemically resistant topcoat which is highly transparent, substantially completely resistant to discoloration, e.g., yellowing, upon subjection to elevated temperature and which is relatively free from undesirable softness.

THE ACID COMPONENT

The copolymers of butyl methacrylate and acrylic acid, methacrylic acid or mixtures thereof which are employed in the present invention contain from about 3 to about 15 mol percent and preferably from 4 to 10 mol percent of said acid. Other similar acids, notably fumaric acid, maleic acid, crotonic acid and itaconic acid, cannot be used to provide the outstanding finishing varnishes of the invention.

The presence of acrylic acid, methacrylic acid or mixtures thereof in the copolymer is essential to provide adhesion to the underlying base and to provide carboxyl groups for reaction with the oxirane groups of the polyepoxide component. At least 3 mol percent of said acid based on carboxyl is necessary for adequate cure with the polyepoxide component. On the other hand, excess carboxyl above about 15 mol percent leads to excessive brittleness and to loss of water resistance and the copolymers are not sufficiently inert to provide a satisfactory finishing varnish. An acid content of from 4–8 mol percent is particularly desirable when the relative viscosity of the copolymer is above 1.15 to provide improved resistance to fabrication as will be more fully explained hereinafter. The relative viscosity limitation of the copolymer is explained hereinafter under Copolymer Molecular Weight.

THE ESTER COMPONENT

The balance of the copolymers, exclusive of acid component, consists essentially of butyl methacrylate though up to about 25 mol percent of other esters of acrylic or methacrylic acid, particularly alkyl, cycloalkyl, tetrahydrofurfuryl or alkoxy alkyl esters may be present. The other acrylic acid or methacrylic acid esters which may optionally be included in minor proportion in accordance with the invention are preferably esters of the aforesaid acids with a lower alcohol or alkoxy alkanol. The length of the carbon chain in the alcohol of the ester group is preferably from 1–4 carbon atoms, for when longer ester groups are used, the polymer is softened.

Illustrative arcrylic esters which may be used are methyl, ethyl, butyl, isooctyl and decyl acrylates. Illustrative methacrylic esters are ethyl, butyl, hexyl, decyl and stearyl methacrylates.

Other esters of acrylic and methacrylic acids which may be employed are methoxy ethyl and butoxy ethyl acrylates and methacrylates, cyclohexyl acrylates and methacrylates. Tetrahydrofurfuryl acrylate and methacrylate are further illustrations of the type of esters which may be employed in accordance with the invention.

It is desired to point out that the ester component of the copolymers of the invention is critically limited to being largely constituted by butyl methacrylate. The corresponding methyl, ethyl, propyl and isopentyl esters are excessively hard and inflexible. The corresponding hexyl, octyl and decyl esters of methacrylic acid are excessively soft. The alkyl and other esters of acrylic acid and other similar acids do not provide, upon copolymerization of these esters with acrylic or methacrylic acid, a copolymer adapted to function satisfactorily in a finishing varnish formulation and do not possess the necessary build or gloss needed for a "wet ink" varnish.

COPOLYMER MOLECULAR WEIGHT

The copolymers of the present invention are generally of low molecular weight as indicated by a relative viscosity measured at 25° C. in a 1 gm./100 ml. solvent solution in dimethyl formamide of at least 1.15, and less than about 5.0.

Copolymers having a molecular weight higher than indicated by a relative viscosity of 2.0 are not adequately solvent-soluble in commercial solvents, particularly in inexpensive aromatic solvents such as xylene and these can be applied from water medium. Copolymers having a relative viscosity of from 1.15 to about 1.6 are particularly adapted to be applied from organic solvent medium, particularly the more solvent soluble copolymers having a relative viscosity less than about 1.35. Copolymers of relative viscosity above about 1.6 are particularly adapted to be applied from water medium. Copolymers of lower molecular weight on the same relative viscosity basis (relative viscosity less than 1.15) possess inferior physical properties, e.g., are brittle, not sufficiently cohesive and are inadequate as to film integrity.

Relative viscosity of the resin at 1 gram per deciliter of dimethyl formamide is determined in an Ostwald-Fenske viscosimeter and is computed as follows:

$$\text{Relative viscosity} = \frac{\text{Solution efflux time}}{\text{Solvent efflux time}}$$

The relative viscosity is thus obtained by direct measurement. Specific viscosity may be derived by subtracting 1.0 from the relative viscosity.

COPOLYMER PRODUCTION

In order to produce the low to medium molecular weight copolymers which are employed in the invention, the monomer components may desirably be dissolved in an organic solvent and copolymerization effected in the solution in the presence of a vinyl polymerizing catalyst.

The copolymers of the invention may also be produced by various other copolymerization methods, such as by polymerization in bulk or in aqueous emulsion. Emulsion polymerization and polymerization in bulk normally produce copolymers of excessively high molecular weight but these procedures may be conducted to provide copolymers of intermediate molecular weight having a relative viscosity within the range set forth hereinbefore which may be used to advantage in accordance with the present invention.

SOLVENT SOLUTION COPOLYMERIZATION

In solvent solution copolymerization, the monomeric reactants are dissolved in an organic solvent which is non-reactive with respect thereto, such as methyl ethyl ketone, and a free radical polymerization catalyst such as an organic peroxide or azo catalyst is incorporated in the solvent, generally in an amount of about 0.25–5.0% by weight based on the weight of the monomer. The solution is then heated and maintained at an elevated temperature while the reactants combine to form a heat softenable solvent-soluble copolymer. The reaction is conveniently carried out by maintaining the solution at or near reflux temperature for several hours, e.g., 5–15 hours.

CATALYST

The copolymer of the invention is preferably produced with the aid of a free radical polymerization catalyst in order to reduce the reaction time, but a catalyst is not essential to the reaction. Azodiisobutyronitrile and benzoyl peroxide are two examples of useful catalysts for the purpose, in proportions by weight of 0.25% to 5% of the combined weight of the monomer components. Other catalysts may be selected from known vinyl polymerizing catalysts, such as organic oxidizing agents which contain the peroxide linkage O—O, and azo compounds. It is preferred to use 1% or less by weight of catalyst since this leads to copolymers of higher molecular weight which have improved toughness and resistance to fabrication, particularly at low acid content.

REACTION CONDITIONS

The temperatures and pressure conditions for making the starting copolymers of the invention are not precisely limited, but for practical purposes are in the range of −20° C. to 150° C. at atmospheric pressure. The time for making the copolymers of the invention can vary from a few mintues to several days, depending on the temperature and pressure, the yield sought, and the catalyst used, if any. While the yield can be carried above 90%, the invention does not require high yield of copolymers. Particularly when the catalyst concentration is less than 1% and when reaction temperature is lowered to achieve higher molecular weight copolymers, a lower yield may be preferred.

SOLVENT

The copolymers of the invention are preferably produced with the aid of a non-reactive solvent since copolymerization in a non-reactive organic solvent solution permits the achievement of a copolymer product of uniform composition and molecular weight. However, solvent is not essential to the copolymerization reaction.

Any organic solvent may be selected which is a good common solvent for the reactants in their original state, and for the completed copolymer, and which does not substantially prevent or enter into the copolymer-producing reaction. Examples of such solvents are the following, including mixtures thereof: aromatic hydrocarbon solvents such as benzene, toluene and xylene, ethyl benzene, isopropyl benzene and commercial mixed aromatic hydrocarbon solvents (mixed with more active solvents when using lower molecular weight acrylic and methacrylic esters); alcohols, such as ethylene glycol monobutyl ether, ethylene glycol monomethyl ether, diethylene glycol monobutyl ether, diethylene glycol monomethyl ether, and diethylene glycol monoethyl ether; ketones, such as acetone, methyl ethyl ketone, methyl isobutyl ketone and cyclohexanone; and such solvents as diacetone alcohol, dimethyl formamide, ethyl acetate and butyl propionate.

EMULSION POLYMERIZATION

The higher molecular weight copolymers of the invention are conveniently made by emulsion polymerization in water medium. In emulsion polymerization the monomers are dispersed in water containing a reducing agent and an oxidizing agent and preferably also a wetting agent and the copolymerization reaction is permitted to continue in emulsion, generally at temperatures of from room temperature to about 100° C. A preferred reducing agent is sodium m-bisulfite. A preferred oxidizing agent is potassium persulfate. A preferred wetting agent is sodium lauryl sulfate. Wide variation in the selection of reducing agents, oxidizing agents and wetting agents is permissible as is well known to the art and as is illustrated in the United States Patents Nos. 2,462,354 and 2,519,135.

Thus, an aqueous medium containing about 0.1 to 2% of an oxygen liberating catalyst such as hydrogen peroxide, benzoyl or other organic peroxide, or a soluble salt of perdisulfuric acid, about 0.05 to 0.5% of an oxidizable oxygen-containing sulfur compound, such as sodium bisulfite or sulfinic acid or alkali metal salt thereof, and about 0.1 to 5% of a suitable dispersing agent is charged into a reaction vessel provided with means for effective agitation. The reaction vessel is then closed and the air in the free space above the liquid is preferably displaced by an inert gas such as nitrogen.

Broadly, the reaction may be conducted at any temperature between about 0° C. and 125° C. and it may be substantially completed within about 10–15 minutes or, at lower temperatures, several days may be required. Preferably the reaction is effected at temperatures between 60° C. and 100° C. in a period of from ¼ to 2 hours.

THE POLYEPOXIDE COMPONENT

The polyepoxide which is selected should boil about 300° C. at normal atmospheric pressure, have a molecular weight between about 300 and about 1200 and have a 1,2-epoxy equivalency greater than 1.0. Desirably, the polyepoxide may be an aromatic or cycloaliphatic polyepoxide having at least one terminal epoxy group and a 1,2-epoxy equivalency greater than 1.0 and preferably in excess of 1.4 and of sufficiently high molecular weight to be of low volatility during the baking operation.

The polyepoxide component is to be employed in an amount sufficient to provide at least about 0.1 mol of oxirane group in the polyepoxide per mol of carboxyl group in the copolymer. An excess quantity of the polyepoxide component may be used but it is preferred to employ not more than 18 parts of the polyepoxide per 100 parts of the final resinous product. Above 18 parts of polyepoxide per 100 parts of resinous product, the excess polyepoxide serves little purpose and is not economical.

The polyepoxide component in accordance with the invention is intended to produce with the copolymer component a compatible solution in organic solvent (preferably largely constituted by mononuclear aromatic hydrocarbon solvent) in which the oxirane groups of the polyepoxide are reactive with the carboxyl groups of the copolymer to provide a cross-linking curing reaction as evidenced by resistance to water and water vapor at elevated temperature.

Desirably, the polyether epoxides are the polyglycidyl polyethers of dihydric phenols, such as p,p'-dihydroxy diphenyl 2-2' propane (bisphenol A), or polyhydric alcohols, such as glycerine or pentaerythritol. These polyethers of dihydric phenols have glycidyl radicals linked to the aromatic hydrocarbon radical by etheral oxygen atoms.

More preferably, the polyether is of resinous character containing at least one aromatic hydrocarbon radical which is connected to a glycidyl group through an ether oxygen linkage. There are preferably provided a total of at least 1.4 and desirably about 2 such glycidyl groups each having a terminal oxirane group and recurring aromatic groups interlinked through ether oxygens to an intervening aliphatic radical which may contain secondary hydroxyl groups as the sole reactive group and which may, if desired, contain internal ether groups.

As is known, the polyether is a complex mixture of compounds rather than being a single particular compound.

Any of the various dihydric phenols, or a mixture thereof, may be used in preparing the polyethers, including mononuclear phenols such as resorcinol, catechol, hydroquinone, methyl resorcinol, etc.; or polynuclear phenols like p,p' dihydroxy diphenyl 2-2' propane (bisphenol A), 4,4' - dihydroxybenzophenone, bis (4 - hydroxyphenyl) methane, 1,1'-bis (4-hydroxy phenyl) ethane, 1,1'-bis (4 - hydroxyphenyl) isobutane, 2,2' - bis (3 - hydroxyphenyl) butane, 2,2' - bis (4 - hydroxy - 2 - methylphenyl) propane, 2,2'-bis (2-hydroxynaphthyl) pentane, 1,5-dihydroxynaphthalene, etc. The preferred phenol is p,p'-dihydroxy diphenyl 2-2' propane.

The polyethers are prepared, in general, by heating at about 30° C. to 200° C. one or a mixture of dihydric phenols with epichlorohydrin, dichlorohydrin or mixtures thereof in a basic reaction medium. The preparation of polyglycidyl ethers of bisphenol having a 1,2-epoxy equivlency in excess of 1.4 and of various molecular weight is well known.

Polyepoxides having an aromatic backbone are preferred because aliphatic materials do not provide as good physical characteristics. A suitable aliphatic polyepoxide is polyether B described in the United States patent to F. E. Condo et al., No. 2,752,269. A commercially available similar product is Epon 562.

Particularly preferred polyglycidyl ethers of bis-phenol A in accordance with the present invention and having a 1,2-epoxy equivalency in excess of 1.4 and preferably about 2 are those having a molecular weight in the range of from about 360 to about 1200. These resins have an epoxy value of about 0.15 to 0.5. The epoxy value may be defined as the number of mols of epoxy groups in 100 grams of polyepoxide resin component.

A polyepoxide of relatively low molecular weight (350-370) and having an epoxy value of about 0.5–0.54 which may be employed in accordance with the present invention may be prepared in accordance with the instructions set forth in the section designated "Polyether A" in the United States patent to B. C. Shokal et al., No. 2,-643,239, dated June 23, 1953. In this manner there is provided liquid polyepoxides of minimum molecular weight using bisphenol A and a large excess of epichlorohydrin. By reducing the molecular excess of epichlorohydrin, products of somewhat higher molecular weight may be obtained.

A further liquid polyepoxide resin which may be used is the reaction product of bisphenol A and epichlorohydrin having a molecular weight of 390 and an epoxy value of 0.54. A commercially available material of this type is Epon 828. By reducing the mol ratio of epichlorohydrin to bisphenol A to a value of less than 2.1, still higher molecular weight products may be achieved. A polyepoxide having a molecular weight of 630 and an epoxy value of 0.26 and produced by reaction of bisphenol A and epichlorohydrin may also be employed. A commercially available material of this type is Epon 864. Epon 834 having a molecular weight of about 530 and an epoxy value of 0.38 and Epon 1001 having a molecular weight of about 1000 and an epoxy value of 0.20 are also well adapted to use in the invention. The molecular weights referred to above will be understood to refer to average molecular weight.

Other commercial available epoxy resins which may be employed are Araldite 6010, Bakelite ERL-2774, and Epi-Rez 504 and 510.

Other types of polyepoxides may be employed, although the use of polyglycidyl ethers of bisphenol is outstanding with respect to adhesion after contact with liquid water at elevated temperature. Thus, a copolymer of ethyl methacrylate, glycidyl methacrylate and acrylonitrile in weight proportions of 74–10–15 prepared by solvent solution polymerization at a temperature of about 80–100° C. in the presence of a free radical polymerization catalyst such as an azo catalyst (azo diisobutyronitrile, for example) may be used. Desirable results can also be achieved using polyepoxides such as EP–201 (Carbide & Carbon) which contains about 92% by weight of

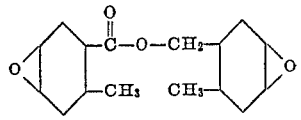

in which the 1,2-epoxy groups are cyclohexyl epoxy groups. The remaining 8% is a mixture of products similar to that pictured above and in which oxidation has proceeded excessively or in which only a single cyclohexyl epoxy group is formed as a result of insufficient epoxidation.

A further illustration of a reactive epoxide material which may be employed in accordance with the invention is the triglycidyl ether of trimethylol propane having a 1,2-epoxy equivalency of about 3.0.

Still other reactive epoxide materials which may be employed are, for example, copolymers of glycidyl compounds such as glycidyl acrylates and allyl glycidyl ether with acrylate or methacrylate esters such as those disclosed in the patent to Erickson, No. 2,556,075, dated June 5, 1951, and the patent to Rothrock et al., No. 2,687,405, dated August 24, 1954. Further, acrylic-carboxylic copolymers which may optionally contain a nitrile comprising such as those described hereinbefore and containing up to about 5% by weight of allyl glycidyl ether may also be employed as the polyepoxide component.

THE CARBOXYLIC-POLYEPOXIDE CURE

Basic curing catalysts suitable for use in converting the copolymer-epoxy blends of the invention to the thermoset state include alkaline reacting substances, alkaline reacting salts and basic nitrogen compounds.

The basic curing catalysts are preferably used in small amounts of from about 0.1% to about 4% based on the total weight of copolymer and polyepoxide. As little as 0.675% of dimethylaminomethyl phenol, or 0.45% of triethylamine is effective to catalyze the reaction. More than 4% of basic curing catalyst may be used but it is preferred to employ the smallest effective amount to avoid detrimentally affecting film properties.

Among the various basic curing catalysts which may be employed, there is here listed a number of preferred, the listing being by no means exhaustive:

Dimethyl laurylamine
Dilauryl methylamine
Diphenylguanidine
N-(2-hydroxypropyl)ethylenediamine
Phenylene diamine
N-benzyl trimethyl ammonium methoxide or hydroxide
Phenyl biguanidine
Phenyl guanidine stearate
Di-isobutyl phenoxy ethoxy ethyl dimethyl benzylammonium chloride monohydrate—(Hyamine 1622)
$C_{18}$ aliphatic substituted diethylenetriamine, i.e., octadecyl diethylene triamine Acetic acid may desirably be included as a stabilizer for the basic catalyst, particularly when the catalyst is a quaternary ammonium salt, the acetic acid functioning to increase the period of time during which the coating solutions of the invention may be stored in the presence of catalysts at room temperature without significant increase in viscosity or gelation.

FILM PRODUCTION

In accordance with the invention, films are produced by the application to a base of the copolymer-polyepoxide mixture of the invention in the form of a film. The film may be deposited from organic solvent solution or from aqueous emulsion. These films are then baked to cause esterification of the oxirane groups of the polyepoxide component with the carboxylic groups of the acid component of the copolymer. As indicated hereinbefore, the organic solvent solution preferably contains a basic curing catalyst to accelerate the esterification reaction and to lower the temperature at which such reaction takes place.

SOLVENT APPLICATION

Solvents suitable for use with the copolymers of the invention to provide solvent solution coating compositions are any of those mentioned hereinbefore as suitable for use in the copolymerization reaction, and others selected from those suitable for vinyl polymers in general, e.g., isophorone.

Preferred solvent combinations comprise 50% or less of active solvent and 50% or more of diluent or less active solvent such as: (1) 1:1 cyclohexanone-xylol; (2) 1:1 diacetone alcohol-xylol; (3) 65:35 xylol dimethyl formamide; and (4) 80:20 xylol-butanol.

Up to 30% of mineral hydrocarbon solvents of medium volatility such as commercial mixtures of aromatic hydrocarbon which may contain small amounts of aliphatic hydrocarbons may be employed.

EMULSION APPLICATION

The copolymer polyepoxide mixtures of the invention may be applied from water medium containing the butyl methacrylate-acrylic or methacrylic acid copolymers of the invention dispersed therein. This procedure is particularly adapted for use when the copolymer is of higher molecular weight and hence less soluble in organic solvent medium. For this purpose, the copolymer prepared by aqueous emulsion polymerization is treated with sufficient ammonia or other volatile base such as triethylamine, dimethylamine, etc., to provide a pH between 7.0 and 8.9, preferably pH 8.0. At these neutral to slightly alkaline conditions, the aqueous emulsion is well adapted to wet a metal base, ink or coated base and to deposit a uniform film of the butyl methacrylate-acrylic or methacrylic acid copolymer. Upon baking, the ammonia or other volatile base evaporates and the acidic copolymer is free to react with the oxirane group of the polyepoxide component to provide the cures which are desired in accordance with the invention. The volatile base also serves as the cross-linking catalyst. An additional catalyst, such as Hyamine 1622 (diisobutyl phenoxy ethoxy ethyl dimethyl benzylammonium chloride, monohydrate) may also be added.

The polyepoxide component may be present in the copolymer emulsion either as a dispersion in the water medium or it may be dissolved in the water.

FABRICATION

It is desirable that coating compositions which are intended to be fabricated after baking posses a degree of slickness to permit the fabricating surfaces (forming dies) to slip with respect to the baked film. To facilitate slippage of the forming dies, it is desirable to include a small proportion of a waxy material such as a silicone resin or a wax such as spermaceti wax in the composition. Care must be taken to avoid excessive use of the waxy material because this detrimentally affects wet ink bleeding. Particularly preferred results are obtained when 80 parts of solvent solution of copolymer to which has been added .01 part of a solvent-soluble silicone resin such as SF–69 is blended with 20 parts of the composition of Example II containing 33 part of spermaceti wax. The total formula desirably contains from 0.20–0.50% of wax and/or from 0.006–0.02% of silicone resin. The silicone resin lubricants which may be used are organopolysiloxane polymers having a viscosity in the range of 0.65– about 1,000,000 centistokes and particularly methyl and phenyl polysiloxanes having a viscosity of 4–30 centistokes at 100° F.

The invention is illustrated in the examples and tables which follow:

Example I 92 parts of butyl methacrylate (containing 0.01% hydroquinone) and 5 parts of glacial acrylic acid were dissolved in 97 parts of methyl ethyl ketone and the mixture was heated with stirring for 7 hours at 80° C. in the presence of 1% benzoyl peroxide. At the end of this period 96% of the monomer had been converted to copolymer having a relative viscosty of 1.20. By heating the product for 30 minutes at 300° F. it was found that the percent solids was 48.0%. Upon dilution to 24% solids, the viscosity was 20 seconds. The product was infinitely dilutable with xylene. The copolymer in solid form could be recovered by evaporation of solvent.

*Example II*

A preferred coating composition containing the copolymer of Example I was made as follows:

100 parts of copolymer and 5 parts of Epon 828 were dissolved in 195 parts of an 85:15 parts by weight mixture of xylol/butanol to produce a base solution containing 35% by weight of resin solids. This base solution was then thinned to coating viscosity by addition of a solvent mixture as indicated in Table I wherein excellent gloss, flow and wet inking characteristics are illustrated.

TABLE I

| Solvent combination | | Viscosity No. 4 Ford cup, 80° F. | Gloss | Flow | Wet ink bleeding |
| --- | --- | --- | --- | --- | --- |
| Isophorone | Dipentene | | | | |
| 20 | ----- | 31 | Excellent | Very good | None. |
| 15 | 5 | 29 | Good | Good | Do. |
| 15 | 5 | 29 | ---do--- | ---do--- | Do. |

*Example III*

The following formula produced as indicated in Example II gave good flow and gloss and no bleeding when applied over wet ink.

Component: Weight percent
- BMAGA (copolymer Ex. I)[1] _____ 23.8
- Epon 828 _____ 1.2
- Xylol _____ 39.5
- Butanol _____ 7.0
- Hyamine 1622 _____ .2
- Mixture of aromatic solvents[2] _____ 22.9
- Isophorone _____ 5.4

100.0

[1] BMAGA is a copolymer of butyl methacrylate and acrylic acid.
[2] A commercial mixture of aromatic hydrocarbon solvents having a boiling range of from 320-360° F. with about 50% boiling below about 327° F., a specific gravity at 60/60° F. of 0.87, a mixed aniline point of 64.4° F., a kauri-butanol value of 91 and containing 96.4% aromatics.

Wet inking properties are evaluated by applying by roller coating the test formulations over freshly lithograph painted metal and immediately baking. There shall be no bleeding of the ink into the varnish nor smudging or loss of definition of the print.

*Example IV*

Example II was repeated with the addition of 30 parts of Uformite MX-61 for every 70 parts of BMAGA copolymer. The inclusion of Uformite MX-61 provided improved adhesion particularly over white pigmented thermosetting vinyl primers and further provided improved ultraviolet and heat resistance. However, baked films produced from the composition of this example when thinned with solvent as indicated in Example II were more brittle than those produced in Example II and fabrication resistance was less satisfactory than in Example II.

*Example V*

Examples II and IV were repeated with the incorporation of titanium dioxide pigment in the coating composition. The presence of the titanium dioxide pigment improved resistance to ultraviolet light and heat.

As indicated before, the pigmented coatings such as those specified in Example V are useful as reflector coatings in which event the metal to be coated is frequently preformed and impact resistance as well as heat and ultraviolet light resistance are of importance. Pigmented coatings in accordance with the invention are also particularly adapted for the exterior coating of containers for foods and beverages in which the capacity of the coating to resist discoloration upon subjection to elevated temperatures (as are produced by a dry heat of 400° F. for 10 minutes used for sterilization) is used to advantage. These coatings are also of value upon the exterior of aerosol containers in which the Freon resistance of these coatings is important. Thus, the filled cans are tested by passing them through a hot water bath to test for leakage and the water of the bath takes up Freon from leaking containers and tends to attack a coating lacking in resistance to Freon. The coatings may be applied to the can or container bodies or ends or any other metal component thereof.

*Example VI*

Emulsion polymerization to produce copolymers which may be used in the invention will be illustrated by the copolymerization of 92 parts of butyl methacrylate and 5 parts of acrylic acid in 194 parts of distilled, reboiled and deoxygenated water in the presence of various proportions of sodium m-bisulfite, sodium lauryl sulfate and potassium persulfate. The bisulfite and sulfate were added with stirring to the water at 62° C. under a nitrogen atmosphere together with the monomer components. The persulfate was then added and the batch reacted as indicated in the following Table II, cooled and discharged.

TABLE II

| Run | Potassium persulfate | Sodium m-bisulfite | Sodium lauryl sulfate | Time (min.) | Peripheral speed stirring blade (ft./min.) | Temp., °C. | Percent conversion | Relative viscosity |
| --- | --- | --- | --- | --- | --- | --- | --- | --- |
| 1 | 0.30 | 0.10 | 0.5 | 150 | 4,000 | 60-100 | 97 | 1.95 |
| 2 | 0.30 | 0.10 | 0.5 | 102 | 4,000 | 60-100 | 94 | 1.68 |
| 3 | 0.20 | 0.10 | 0.5 | 30 | 4,000 | 60 | 94 | 2.07 |
| 4 | 0.30 | 0.10 | 0.25 | 30 | 2,700 | 60 | 94 | 1.71 |
| 5 | 0.30 | 0.10 | 0.5 | 30 | 2,700 | 60 | 95 | 1.83 |
| 6 | 0.30 | 0.10 | 1.0 | 30 | 2,700 | 60 | 95 | 1.93 |
| 7 | 0.25 | 0.10 | 0.5 | 30 | 2,000 | 60 | 95 | 1.76 |
| 8 | 0.25 | 0.10 | 0.5 | 30 | 3,400 | 60 | 96 | 1.70 |
| 9 | 0.30 | 0 | 0.5 | 30 | 2,700 | 76-92 | 96 | 2.34 |
| 10 | 0.30 | 0 | 0.5 | 30 | 2,700 | 100 | 95 | 1.85 |
| 11 | 0.30 | 0 | 0.5 | 30 | 4,000 | 100 | 97 | 1.93 |
| 12 | 0.30 | 0 | 0.5 | 15 | 4,000 | 100 | 97 | 1.32 |
| 13 | 0.30 | 0 | 0.5 | 30 | 4,000 | 100 | 93 | 1.40 |
| 14 | 0.30 | 0 | 0.5 | 40 | 4,000 | 100 | 95 | 1.37 |
| 15 | 0.30 | 0 | 0.5 | 25 | 4,000 | 100 | 94 | 1.46 |

Upon discharge, ammonia was added to provide a pH of 8.0. The thickness of the emulsion varied somewhat although all of the above emulsions were coatable. The pH could vary between about pH 7.0 to about pH 8.9 while retaining coatability of the emulsion.

The necessity for employing a polyepoxide component to cure copolymers of butyl methacrylate with acrylic acid and provide a satisfactory finishing varnish is illustrated in Table II in which the copolymer of butyl methacrylate and acrylic acid (abbreviated BMAGA) was produced by solvent solution copolymerization at 80° C. for 10 hours to provide 95% conversion of monomer to copolymer and to provide a copolymer having a viscosity of 108 seconds at 24% solids in xylol. The data included in Table III shows the results at baking temperatures up to 400° F. so that it will be apparent that the finishing varnishes of the invention cannot be duplicated by mere resort to higher baking temperatures.

TABLE III.—THE POLYEPOXIDE-BMAGA CURE

| | | | | |
|---|---|---|---|---|
| BMAGA, 92-5 | 100 | 100 | 100 | 100 |
| EPON 828 | | 8 | | |
| Hyamine 1622 [1] | | 1 | 1 | 1 |
| BMAAGE [2] | | | 16 | |
| EHAAGE [3] | | | | 16 |
| Percent applied solids | 27.0 | 27.7 | 27.4 | 27.4 |
| Solvent | | 85/15 xylol/butanol | | |
| Coating weight mg. s. i | | About 5 | | |

PROPERTIES FOR 10'/300° F. BAKE ON TINPLATE

| | | | | |
|---|---|---|---|---|
| Fabrication | Good | Good | Good | Good |
| Processing—90'/250° F.: | | | | |
| Blush | 3 | 10 | 10 | 9 |
| Blistering | 5 | 10 | 10 | 10 |
| Spotting | 2 | 10 | 10 | 10 |
| Wet adhesion | 10 | 10 | 10 | 10 |

PROPERTIES FOR 10'/400° F. BAKE ON TINPLATE

| | | | | |
|---|---|---|---|---|
| Fabrication | Good | Good | Good | Good |
| Processing—90'/250° F.: | | | | |
| Blush | 7 | 10 | 10 | 10 |
| Blistering | 9 | 10 | 10 | 10 |
| Spotting | 6 | 10 | 10 | 10 |
| Wet adhesion | 10 | 10 | 10 | 10 |

[1] Hyamine 1622 is diisobutyl phenoxy ethoxy ethyl dimethyl benzyl-ammonium chloride, monohydrate.
[2] BMAAGE is a copolymer of butyl methacrylate and allyl glycidyl ether.
[3] EHAAGE is a copolymer of ethyl hexyl acrylate and allyl glycidyl ether.

Table III above includes an illustration of employing as the polyepoxide component a copolymer comprising allyl glycidyl ether. Thus, it will be seen that the incorporation of copolymers of allyl glycidyl ether with various acrylates or methacrylate esters such as butyl methacrylate and ethyl hexyl acrylate supplies the required polyepoxide cure to provide satisfactory finishing varnishes in accordance with the invention. In each instance, the copolymer with allyl glycidyl ether was prepared by reacting 20 parts of the ester component with 30 parts of allyl glycidyl ether in the presence of 1% azodiisobutyronitrile, the reaction being performed at 80° C. for a period of ten hours.

To illustrate the partial replacement of butyl methacrylate with other vinyl unsaturated copolymerizable compounds, attention is directed to Table IV in which vinyl acetate is employed to partially replace butyl methacrylate in the butyl methacrylate-acrylic acid copolymer. The copolymer including vinyl acetate was produced by copolymerizing monomer components in the weight proportions designated in the table in methyl ethyl ketone solvent solution containing 1% by weight of benzoyl peroxide at 80° C. for 10 hours.

TABLE IV.—VINYL ACETATE-CONTAINING BMAGA (VABMAGA)

| | | |
|---|---|---|
| VABMAGA (14-69-5) | 100 | 100 |
| EPON 828 | | 8 |
| Hyamine 1622 | | 1 |
| Percent applied solids | 32.0 | 32.7 |
| Solvent | Methyl ethyl ketone | |
| Coating weight, mg. s. i | 4.9 | |

PROPERTIES FOR 10'/300° F. BAKE ON TINPLATE

| | | |
|---|---|---|
| Fabrication | Good | Good |
| Processing—90'/250° F.: | | |
| Blush | 1 | 10 |
| Blistering | 2 | 10 |
| Spotting | 1 | 10 |
| Wet adhesion | 10 | 10 |

PROPERTIES FOR 10'/400° F. BAKE ON TINPLATE

| | | |
|---|---|---|
| Fabrication | Good | Good |
| Processing—90'/250° F.: | | |
| Blush | 1 | 10 |
| Blistering | 3 | 10 |
| Spotting | 2 | 10 |
| Wet adhesion | 10 | 10 |

When the replacement of butyl methacrylate in the copolymer is excessive, the ability of the copolymer to withstand fabrication is impaired.

In Table V which follows, the properties of various copolymers falling within the present invention are compared with respect to wet ink rating, the rating being on a scale from 0 to 10 with 10 indicating a perfect rating in which no bleeding of ink or ink displacement is observed. As will be observed, all of the copolymers falling within the scope of the invention provide satisfactory wet ink ratings, e.g., values of 6 or higher.

TABLE V.—PROPERTIES OF VARIOUS RESINS FOR WET INK BLEEDING

| Resin | Ratio | Solvent | Wet ink rating |
|---|---|---|---|
| MADBMAGA | 3-88-5 | MEK | 8 |
| VYBMAGA | 16-69-5 | MEK | 8 |
| VABMAGA | 14-69-5 | EtOAc | 8 |
| NVPBMAGA | 18-69-5 | MEK | 6 |
| BMAGA | 92-5 | MEK | 7 |

NOTE.—MAD designates methacrylamide. NVP designates n-vinyl pyrrolidone. VY designates vinylidene chloride.

The wet ink rating test referred to is conducted by applying the copolymer at 30% solids in methyl ethyl ketone to a thin cross-hatched wet film of a conventional red ink employed in lithographic printing, the red ink being Duralite Cresco 3006. The resin is applied by placing by placing a drop of the resin solution upon the cross-hatched ink and then observing the resulting bleeding and/or displacement of the red ink under a microscope.

The criticality of employing a copolymer of butyl methacrylate is illustrated in Table VI.

TABLE VI.—HIGHER METHACRYLATE GA RESINS—EPON CURED

| | | | | | | | | | |
|---|---|---|---|---|---|---|---|---|---|
| BMAGA, 92-5 | 100 | | | | | | | | |
| HMAGA: | | | | | | | | | |
| 92-5 | | 100 | | | | | | | |
| 110-5 | | | 100 | | | | | | |
| DOMAGA: | | | | | | | | | |
| 92-5 | | | | 100 | | | | | |
| 157-5 | | | | | 100 | | | | |
| LMAGA: | | | | | | | | | |
| 92-5 | | | | | | 100 | | | |
| 170-5 | | | | | | | 100 | | |
| SMAGA: | | | | | | | | | |
| 92-5 | | | | | | | | 100 | |
| 219-5 | | | | | | | | | 100 |
| EPON 828 | 8 | 8 | 8 | 8 | 8 | 8 | 8 | 8 | 8 |
| DMP-30 [1] | 1 | 1 | 1 | 1 | 1 | 1 | 1 | 1 | 1 |
| Percent applied solids | 36.9 | 41.8 | 41.8 | 41.8 | 39.7 | 41.8 | 41.8 | 42.7 | 44.8 |
| Solvent | | | | | MEK | | | | |
| Coating weight, mg. s. i | | | | | About 5 | | | | |
| Solution stability, days | 30 | 30 | 30 | 30 | 30 | 30 | 30 | 30 | 15 |

PROPERTIES FOR 10'/400° F. BAKE ON TINPLATE

| | | | | | | | | | |
|---|---|---|---|---|---|---|---|---|---|
| Fabrication | Good | Good | Good | Poor | Bad | Bad | Bad | Bad | Poor |
| Processing—90'/250° F.: | | | | | | | | | |
| Blush | 10 | 10 | 10 | 10 | 10 | 10 | 10 | 10 | 10 |
| Blistering | 10 | 10 | 10 | 10 | 10 | 10 | 10 | 10 | 10 |
| Spotting | 10 | 10 | 10 | 10 | 10 | 10 | 10 | 10 | 10 |
| Wet adhesion | 10 | 10 | 10 | 10 | 10 | 10 | 10 | 10 | 10 |
| Tack | OK | Fair | Fair | Poor | Bad | Bad | Bad | Bad | Bad |

[1] DMP-30 is 2,4,6-trimethylaminomethyl phenol.

NOTE.—HMA is n-hexyl methacrylate. DOMA is 65/35 isodecyl methacrylate/isooctyl methacrylate. LMA is lauryl methacrylate. SMA is steryl methacrylate.

It is generally preferred to employ as little of the amine catalyst as possible since excessive proportions of catalyst tend to impair the ability of the baked coating to withstand water at elevated temperatures. Thus, illustrative data indicating the fact that excessive catalyst concentrations are to be avoided is set forth in Table VII.

Variations in proportion of the polyepoxide component is illustrated in Table VIII in which the proportion of Epon 828 is varied from approximately 2% to about 25% by weight based on the total weight of resin solids. As will be seen, the insolubility of the coating falls off with excessive polyepoxide proportions and the presence of an excessive proportion of polyepoxide produces a slight dulling in the gloss of the copolymer film which is produced.

TABLE VII.—CATALYST VARIATION FOR BMAGA-EPOXIDE CURE

| | | | | | | | | |
|---|---|---|---|---|---|---|---|---|
| BMAGA | 100 | 100 | 100 | 100 | 100 | 100 | 100 | 100 |
| EPON 828 | 8 | 8 | 8 | 8 | 8 | 8 | 8 | 8 |
| N-ethylmorpholine | 1 | 4 | | | | | | |
| Cyclohexylamine | | | 1 | 2 | | | | |
| Dicyclohexylamine | | | | | 1 | 2 | | |
| Secondary amine [1] | | | | | | | 1 | 2 |
| Percent applied solids | 34.1 | 35.5 | 34.1 | 34.4 | 34.1 | 34.4 | 34.1 | 34.4 |
| Solvent | | | | 85/15 xylol/butanol | | | | |
| Coating weight, mg. s. i | | | | About 5 | | | | |
| Solution stability, days | | | 60+ | | | | | |

PROPERTIES FOR 10'/300° F. BAKE ON TINPLATE

| | | | | | | | | |
|---|---|---|---|---|---|---|---|---|
| Fabrication | Good | Good | Good | Good | Good | Good | Good | Good |
| Processing—90'/250° F.: | | | | | | | | |
| Blush | 10 | 0 | 10 | 0 | 10 | 0 | 6 | 0 |
| Blistering | 10 | 0 | 7 | 0 | 10 | 0 | 6 | 0 |
| Spotting | 10 | 0 | 10 | 0 | 10 | 0 | 5 | 0 |

[1] The secondary amine used is a highly-branched, unsaturated, secondary aliphatic amine having a molecular weight in the range of 351-393.

TABLE VIII.—CURE OF BMAGA:EPON 828 VARIATION

| | | | | | | | | |
|---|---|---|---|---|---|---|---|---|
| BMAGA | 100 | 100 | 100 | 100 | 100 | 100 | 100 | 100 |
| EPON 828 | 2 | 4 | 8 | 10 | 12 | 14 | 16 | 32 |
| N-benzyl trimethylammonium methoxide | | | | | 0.8 | | | |
| Percent applied solids | 25.8 | 24.3 | 26.1 | 27.9 | 28.1 | 28.4 | 27.1 | 28.8 |
| Solvent | | | | 85/15 xylol/butanol | | | | |
| Coating weight, mg. s. i | | | | About 5 | | | | |

TABLE VIII—Continued

BAKED AS A FINISHING VARNISH FOR 10'/300° F. OVER WHITE TITANIUM DIOXIDE PIGMENTED THERMOSETTING VINYL RESIN COATED TINPLATE [1]

| | | | | | | | | |
|---|---|---|---|---|---|---|---|---|
| Insolubility [2] | 3 | 15 | 40 | 22 | 48 | 36 | 12 | 8 |
| Processing—90'/250° F.: | | | | | | | | |
| Blush | 10 | 10 | 10 | 10 | 10 | 10 | 10 | 10 |
| | OK | OK | OK | OK | OK | OK | Sl. D. | Sl. D. |
| Gloss | 10 | 10 | 10 | 10 | 10 | 10 | 10 | 10 |
| Blistering | 10 | 10 | 10 | 10 | 10 | 10 | 10 | 10 |
| Spotting | 10 | 10 | 10 | 10 | 10 | 10 | 10 | 10 |

[1] The white titanium dioxide pigmented thermosetting vinyl resin employed as the primer contained as the resinous component 70% by weight of VAGH, 25% of Epon 864, and 5% of a 62.5% butylated urea-formaldehyde resin solids solution in butanol produced by polymerizing and etherifying 1 mol of dimethylol urea in 4 mols of butanol by heating in the presence of phosphoric acid, azeotropically distilling off water, neutralizing the resin so produced and then concentrating the resin to provide the specified solids content. "VAGH" is an acid hydrolyzed copolymer containing 87% by weight of vinyl acetate and having a vinyl alcohol content of 4-6% by weight. The copolymer has a specific viscosity of 0.57 determined in a 1.0% solution in cyclohexanone at 20°C. Based on resin solids, the thermosetting vinyl primer contained 75% by weight of white titanium dioxide pigment. The primer was applied from solvent solution medium and baked at 365° F. for 10 minutes.
[2] Insolubility is measured by the number of double rubs with an acetone soaked cloth required to remove the coating.

NOTE.—Sl. D. designates slightly dull.

The gloss of the topcoat which is produced is also influenced by the proportion of the catalyst which is employed as is illustrated in Table IX which follows:

TABLE IX.—CURE OF BMAGA:N-BENZYL TRIMETHYLAMMONIUM METHOXIDE VARIATIONS

| | | | | |
|---|---|---|---|---|
| BMAGA | 100 | 100 | 100 | 100 |
| EPON 828 | 8 | 8 | 8 | 8 |
| NBTAM | 0.2 | 0.4 | 0.8 | 1.6 |
| Percent applied solids | 28.4 | 28.1 | 27.7 | 26.9 |
| Solvent | 85/15 xylol butanol | | | |
| Coating weight, mg. s. i. | About 5 | | | |
| Solution stability, days | | 40 | | 40 |

AS A FINISHING VARNISH OVER WHITE TITANIUM DIOXIDE PIGMENTED THERMOSETTING VINYL RESIN COATED TINPLATE [1]

| | | | | |
|---|---|---|---|---|
| Insolubility | 10 | 25 | 54 | 26 |
| Processing—90/250° F.: | | | | |
| Blush | 10 | 10 | 10 | 9 |
| | OK | OK | Sl. D. | Dull |
| Gloss | 10 | 10 | 10 | 10 |
| Blistering | 10 | 10 | 10 | 10 |
| Spotting | 10 | 10 | 10 | 10 |

[1] See footnote 1, Table VIII.

NOTE.—Sl. D. is slightly dull. NBTAM designates N-benzyl trimethylammonium methoxide.

To further illustrates the variation in the polyepoxide component which is permissible in accordance with the invention, the results of employing various polyepoxides in amounts of 8 and 16 parts of polyepoxide per 100 parts of BMAGA copolymer is reported in X which follows:

The use of methacrylic acid in the copolymer is illustrated in the following example:

Example VII 92 parts (0.65 mol) of butyl methacrylate (containing 0.01% hydroquinone) and 6.3 parts (0.07 mol) of glacial methacrylic acid were dissolved in 98.3 parts of methyl ethyl ketone and the mixture was heated with stirring for 18 hours at 80° C. in the presence of 1% benzoyl peroxide. At the end of this period 97% of the monomer had been converted to copolymer. By heating the product for 30 minutes at 300° F. it was found that the percent solids was 48.5%. Upon dilution to 24% solids, the viscosity was 13 seconds. The product was infinitely dilutable with xylene. The copolymer in solid form could be recovered by evaporation of solvent.

TABLE XI.—THE POLYEPOXIDE-BMAGMA CURE

| | | |
|---|---|---|
| BMAGA, 92-5 | 100 | |
| EPON 828 | 8 | 8 |
| Hyamine 1622 [1] | 1 | 1 |
| BMAGMA 92-6.3 [2] | | 100 |
| Percent applied solids | 27.7 | 26.5 |
| Solvent | 85/15 xylol/butanol | |
| Coating weight, mg. s. i. | About 5 | |

PROPERTIES FOR 10'/300° F. BAKE ON TINPLATE

| | | |
|---|---|---|
| Fabrication [3] | 16 | 14 |
| Processing—90'/250° F.: | | |
| Blush | 10 | 10 |
| Blistering | 10 | 10 |
| Spotting | 10 | 10 |
| Wet adhesion | 10 | 10 |

See footnotes at end of table.

TABLE X.—CURE OF BMAGA:EPOXIDE VARIATION

| | | | | | | | | |
|---|---|---|---|---|---|---|---|---|
| BMAGA | 100 | 100 | 100 | 100 | 100 | 100 | 100 | 100 |
| NBTAM | 0.8 | 0.8 | 0.8 | 0.8 | 0.8 | 0.8 | 0.8 | 0.8 |
| EPON 815 | 8 | 16 | | | | | | |
| EPON 828 | | | 8 | 16 | | | | |
| EPON 834 | | | | | 8 | 16 | | |
| EPON 864 | | | | | | | 8 | 16 |
| Percent applied solids | 28.0 | 29.4 | 26.1 | 27.1 | 27.7 | 28.6 | 27.7 | 28.6 |
| Solvent | 85/15 xylol/butanol | | | | | | | |
| Coating weight, mg. s. i. | About 5 | | | | | | | |
| Solution stability (days) | | >36 | | >36 | | >36 | | >36 |

AS A FINISHING VARNISH OVER WHITE TITANIUM DIOXIDE PIGMENTED THERMOSETTING VINYL RESIN COATED TINPLATE [1]

| | | | | | | | | |
|---|---|---|---|---|---|---|---|---|
| Processing—90'/250° F.: | | | | | | | | |
| Blush | 10 | 10 | 10 | 10 | 10 | 10 | 10 | 10 |
| | OK | Sl. D. | OK | Sl. D. | OK | Sl. D. | OK | OK |
| Gloss | 10 | 10 | 10 | 10 | 10 | 10 | 10 | 10 |
| Blistering | 10 | 10 | 10 | 10 | 10 | 10 | 10 | 10 |
| Spotting | 10 | 10 | 10 | 10 | 10 | 10 | 10 | 10 |

[1] See footnote 1, Table VIII.

TABLE XI—Continued
PROPERTIES FOR 10′/400° F. BAKE ON TINPLATE

| | | |
|---|---|---|
| Fabrication [3] | 15 | 13 |
| Processing—90′/250° F.: | | |
| Blush | 10 | 10 |
| Blistering | 10 | 10 |
| Spotting | 10 | 10 |
| Wet adhesion | 10 | 10 |

[1] Hyamine 1622 is diisobutyl phenoxy ethoxy ethyl dimethyl benzylammonium chloride monohydrate.
[2] BMAGMA is a copolymer of butyl methacrylate and methacrylic acid in accordance with Example VII.
[3] Screw cap fabrication test: 30=perfect.

The invention is defined in the claims which follow.

I claim:

1. A coating composition comprising an organic solvent solution of a copolymer comprising acid selected from the group consisting of acrylic acid, methacrylic acid and mixtures thereof and butyl methacrylate, said copolymer being constituted by from 3–15 mol percent of said acid with at least about 75% by weight of the balance of said copolymer being butyl methacrylate, said copolymer having a relative viscosity measured at 25° C. in a 1 gram/100 ml. solvent solution in dimethyl formamide of between 1.15 and about 5.0 and a polyepoxide having a 1,2 epoxy equivalency greater than 1.0, a molecular weight of from about 300 to about 1200 and a boiling point at normal atmospheric pressure in excess of 300° C., said polyepoxide being present in said composition in an amount of at least 0.1 mol of oxirane group per mol of carboxylic acid group in said copolymer, said composition including a small proportion of a basic nitrogenous catalyst.

2. A coating composition as recited in claim 1 in which said polyepoxide is present in an amount less than about 25% by weight based on the total weight of resin solids.

3. A coating composition as recited in claim 1 in which the said balance of said copolymer consists of butyl methacrylate.

4. A coating composition as recited in claim 1 in which the said balance of said copolymer comprises up to about 25% by weight of monomer selected from the group consisting of esters of acrylic and methacrylic acids.

5. A coating composition as recited in claim 4 in which said ester monomer is vinyl acetate.

6. A coating composition as recited in claim 4 in which said ester monomer is an alkyl methacrylate other than butyl methacrylate.

7. A coating composition as recited in claim 4 in which said ester monomer is an alkyl acrylate.

8. A coating composition as recited in claim 1 in which said acid is present in an amount of from 4–10 mole percent.

9. A coating composition as recited in claim 1 in which said catalyst is present in an amount of from 0.1–4% by weight based on the total weight of said copolymer and said polyepoxide.

10. A coating composition as recited in claim 1 in which said catalyst is di-isobutyl phenoxy ethoxy ethyl dimethyl benzylammonium chloride monohydrate.

11. A coating composition as recited in claim 1 in which said catalyst is dimethyl lauryl amine.

12. A coating composition as recited in claim 1 in which said catalyst is dilauryl methylamine.

13. A coating composition as recited in claim 1 in which said catalyst is di-isobutyl phenoxy ethoxy ethyl dimethyl benzylammonium chloride monohydrate and acetic acid.

14. A coating composition as recited in claim 1 in which said catalyst is N-benzyl trimethylammonium methoxide.

15. A coating composition as recited in claim 1 in which said polyepoxide has a 1,2-epoxy equivalency of substantially 1.4 or higher.

16. A coating composition as recited in claim 1 in which said polyepoxide is a polyglycidyl ether of a dihydric phenol.

17. A coating composition as recited in claim 16 in which said dihydric phenol is a bisphenol.

18. A coating composition as recited in claim 1 in which said polyepoxide is a diglycidyl ether of 2,2′-bis-(p-hydroxyphenylpropane) having a molecular weight in the range of 300–1200.

19. A finishing varnish composition comprising a liquid organic solvent solution of a copolymer constituted by polymerized monomers comprising acid selected from the group consisting of acrylic acid, methacrylic acid and mixtures thereof and butyl methacrylate, said copolymer being constituted by from 3–15 mol percent of said acid with at least about 75% by weight of the balance of said copolymer being butyl methacrylate, said copolymer having a relative viscosity measured at 25° C. in a 1 gram/100 ml. solvent solution in dimethyl formamide of between 1.15 and about 2.0, and a polyepoxide having a 1,2-epoxy equivalency greater than 1.0, a molecular weight of from about 300 to about 1200 and a boiling point at normal atmospheric pressure in excess of 300° C., said polyepoxide being present in said finishing varnish in an amount of at least 0.1 mol of oxirane group per mol of carboxylic acid group in said copolymer, said solution including a small proportion of a basic nitrogenous catalyst.

20. A finishing varnish composition as recited in claim 19 in which said polyepoxide is present in an amount not more than 18 parts per 100 parts of final resinous product.

21. A finishing varnish composition as recited in claim 19 in which said copolymer has a relative viscosity below about 1.6.

22. A finishing varnish composition as recited in claim 19 in which said organic solvent comprises a major proportion of mononuclear aromatic hydrocarbon solvent.

23. A coating composition comprising a liquid organic solvent solution of a copolymer constituted by polymerized monomers comprising acid selected from the group consisting of acrylic acid, methacrylic acid and mixtures thereof and butyl methacrylate, said copolymer being constituted by from 3–15 mol percent of said acid with at least about 75% by weight of the balance of said copolymer being butyl methacrylate, said copolymer having a relative viscosity measured at 25° C. in a 1 gram/100 ml. solvent solution in dimethyl formamide of between 1.15 and about 2.0 and a polyepoxide having a 1,2-epoxy equivalency greater than 1.0, a molecular weight of from about 300 to about 1200 and a boiling point at normal atmospheric pressure in excess of 300° C., said polyepoxide being present in said coating composition in an amount of at least 1.0 mol of oxirane group per mol of carboxylic acid group in said copolymer, said solution including a small proportion of a basic nitrogenous catalyst, and said solution containing a pigment suspended therein.

References Cited in the file of this patent

UNITED STATES PATENTS

| | | |
|---|---|---|
| 2,604,464 | Segall et al. | July 22, 1952 |
| 2,784,128 | Schroeder | Mar. 5, 1957 |
| 2,795,564 | Conn | June 11, 1957 |
| 2,872,427 | Schroeder | Feb. 3, 1959 |
| 2,872,428 | Schroeder | Feb. 3, 1959 |
| 2,954,358 | Hurwitz | Sept. 27, 1960 |

UNITED STATES PATENT OFFICE
CERTIFICATE OF CORRECTION

Patent No. 3,070,564                      December 25, 1962

Gerald P. Roeser

It is hereby certified that error appears in the above numbered patent requiring correction and that the said Letters Patent should read as corrected below.

Column 1, line 1, after "for" insert -- the --; line 19, for "uti ity" read -- utility --; column 6, line 52, for "2.1" read -- 2:1 --; line 63, for "commercial" read -- commercially --; column 8, line 51, for "posses" read -- possess --; line 63, for "33" read -- .33 --; column 12, line 70, strike out "placing by"; column 17, line 53, for "mole" read -- mol --; column 18, line 52, for "2.0" read -- 2.0, --; line 57, for "1.0" read -- 0.1 --.

Signed and sealed this 3rd day of September 1963.

(SEAL)
Attest:

ERNEST W. SWIDER
Attesting Officer

DAVID L. LADD
Commissioner of Patents